United States Patent [19]
Bacon

[11] 3,807,268
[45] Apr. 30, 1974

[54] PORTABLE TUBE CUTTING HAND SAW AND ATTACHMENT

[76] Inventor: Charles William Bacon, 14 Bellevue Ter., Cromwell, Conn. 06416

[22] Filed: July 28, 1972

[21] Appl. No.: 276,156

[52] U.S. Cl.................... 83/467, 83/471.2, 83/485, 83/564
[51] Int. Cl............................................ B23d 45/12
[58] Field of Search ....... 83/471.2, 471.3, 467, 455, 83/485, 486.1, 563, 564

[56] References Cited
UNITED STATES PATENTS

| | | | |
|---|---|---|---|
| 3,449,992 | 6/1969 | Hanaway | 83/455 |
| 627,183 | 6/1899 | Goodell et al. | 83/466 |
| 2,725,904 | 12/1955 | Broster et al. | 83/486.1 |

*Primary Examiner*—Donald R. Schran
*Attorney, Agent, or Firm*—McCormick, Paulding & Huber

[57] ABSTRACT

A portable power operated rotary hand saw comprises a saw blade, a driving motor and a frame which includes a base plate slot extending in parallel relationship with the plane of the saw blade. The slot takes a T-shaped configuration and a complementary T-shaped guide is received therein and mounted on a pivotally supported plate atop a tube holding attachment. Front and rear stops are provided to limit sliding saw movement and the top plate is supported by upstanding parallel side walls each provided with a pair of notches, small and large respectively. The small and large notches are aligned in pairs to receive tubes with the top plate pivoted upwardly and the saw mounted thereon. When the plate is pivoted downwardly, it engages and holds a tube whereupon the saw is moved forwardly in sliding motion for a radial cut-off operation.

8 Claims, 5 Drawing Figures

PATENTED APR 30 1974
3,807,268
SHEET 1 OF 2

PORTABLE TUBE CUTTING HAND SAW AND ATTACHMENT

BACKGROUND OF THE INVENTION

Various types of tube cutting devices are currently available but there is nevertheless a continuing need for a simple, fast acting and inexpensive portable cut-off device for copper tubing and the like.

SUMMARY OF THE INVENTION

It is the general object of the present invention to provide a portable power driven rotary hand saw and an associated attachment wherein operation is desirably simple with no requirement for a separate clamping operation, and wherein a radial cut-off operation can be carried out accurately and substantially instantaneously.

DESCRIPTION OF PREFERRED EMBODIMENT

Figure 1:
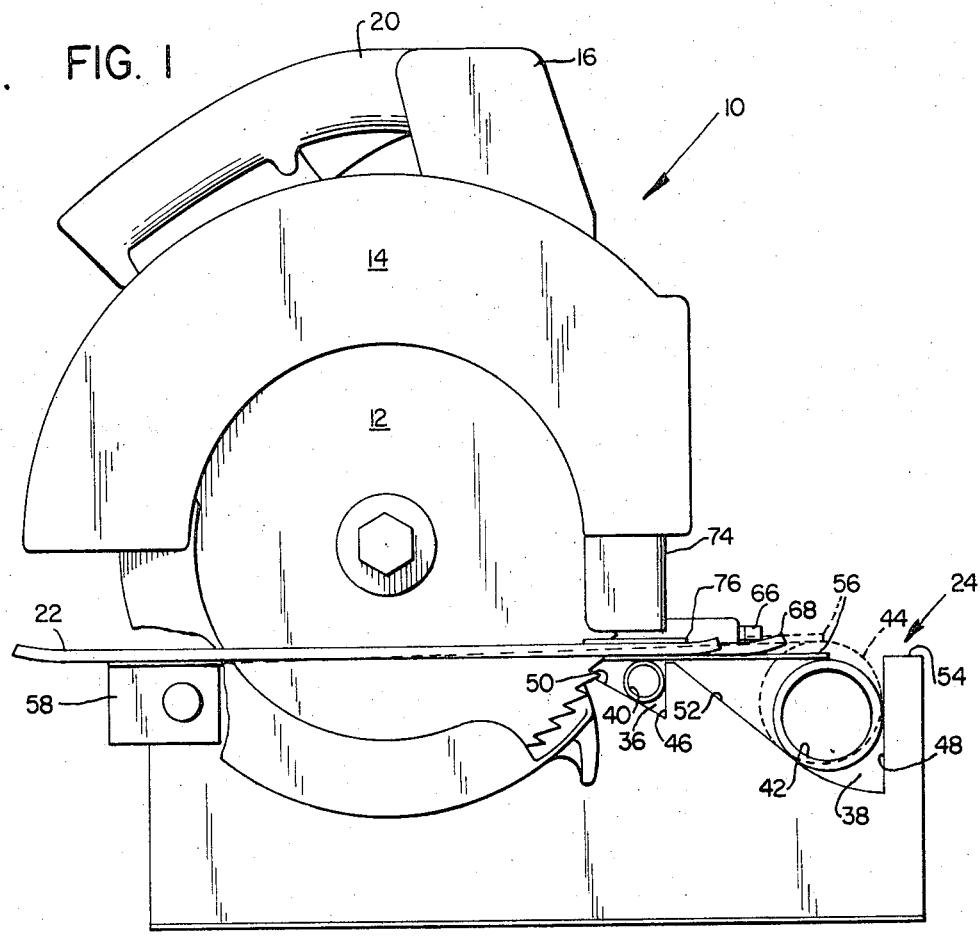
FIG. 1 of the drawings is a side elevation of a portable power operated rotary hand saw and a tube cutting attachment constructed in accordance with the present invention.
Figure 2:
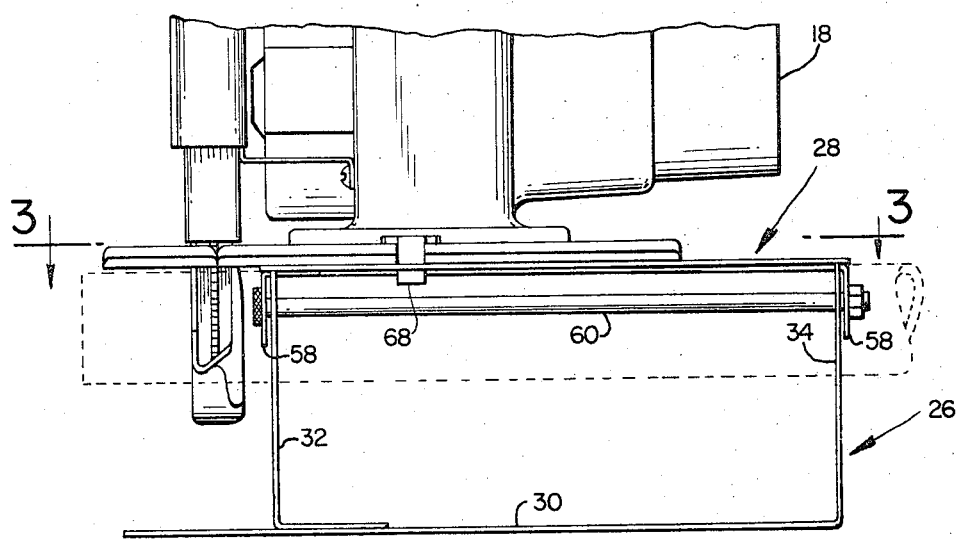
FIG. 2 is a partial front elevation showing the saw and attachment of FIG. 1.

Referring particularly to FIG. 1, it will be observed that a portable hand saw indicated generally at 10 comprises a conventional rotary saw blade 12 of the metal cutting type, a chip and protective shield 14, a frame 16, and, in FIG. 2, an electric driving motor 18. The frame 16 includes a handle 20 and a base plate 22 and the saw is or may be conventional in other respects.

An attachment for adapting the portable saw 10 to radial cut-off operations on copper tubing and the like is indicated generally at 24 and comprises a tube holding device indicated generally at 26 and a saw mounting device indicated generally at 28. The tube holding device may vary widely in form within the scope of the invention but, in the presently preferred form, comprises a base plate 30, parallel upstanding and spaced apart left and right-hand side walls 32 and 34. The device is adapted to receive and support tubes over a range of diameters for a radial cut-off operation. Thus, at least one upwardly open notch is provided in each of said side walls 32, 34 and, as shown, first and second notches 36, 38 are provided in each side wall, left side 32 only illustrated.

The notch 36 shown in FIG. 1 has a corresponding and identical notch 36 in the side wall 34 and said notches are aligned to support a section of copper tubing or the like 40 with its axis parallel with the axis of rotation of the saw blade 12. Similarly, the notch 38 in the side plate 32 has an identical notch 38 aligned therewith in the side plate 34 for receiving a copper tube such as 42 or a somewhat larger tube such as indicated by broken line at 44. The shape of the notches 36, 38 may vary but preferably each of said notches includes a substantially vertical front wall or edge as at 46 and 48. The said vertical notch walls or edges serve a purpose to be set forth more fully hereinbelow.

The rear walls or edges 50, 52 of the respective notches 36, 38 are inclined rearwardly and upwardly from the front edges to define notches capable of receiving tube sections varying over a range of diameters. Further, the notches 36, 38 are preferably so dimensioned as to provide for the upward projection of all tubes beyond the mouth thereof or, more particularly, beyond the upper edges 54 of the side walls 32, 34. Thus, tube sections such as 40, 42, 44 disposed in the notches can be engaged directly by a forward end portion of a flat plate 56 which forms a part of the saw mounting device 28.

The saw mounting device including the plate 56 also comprises short depending skirts or flanges 58, 58 at a rear portion thereof and a pivotal connection is thus effected with the side walls 32, 34. That is, the skirts or flanges 58, 58 are pivotally connected with the side walls 32, 34 by means of a suitable pivot pin or shaft 60 entered in aligned openings in rear portions of the walls 32, 34 and in the flanges 58, 58. As will be apparent, the plate 56 can readily be pivoted in an upward or counterclockwise direction in FIG. 1 whereby to introduce or remove tube sections from the notches 36, 38. When the plate and the saw thereon are subsequently pivoted downwardly in a clockwise direction, a front end portion of the plate 56 engages a tube section such as the sections 40, 42, 44 and positively secures the same for a radial cut-off operation on forward movement of the saw 10 relative to the plate 56.

Figure 3:
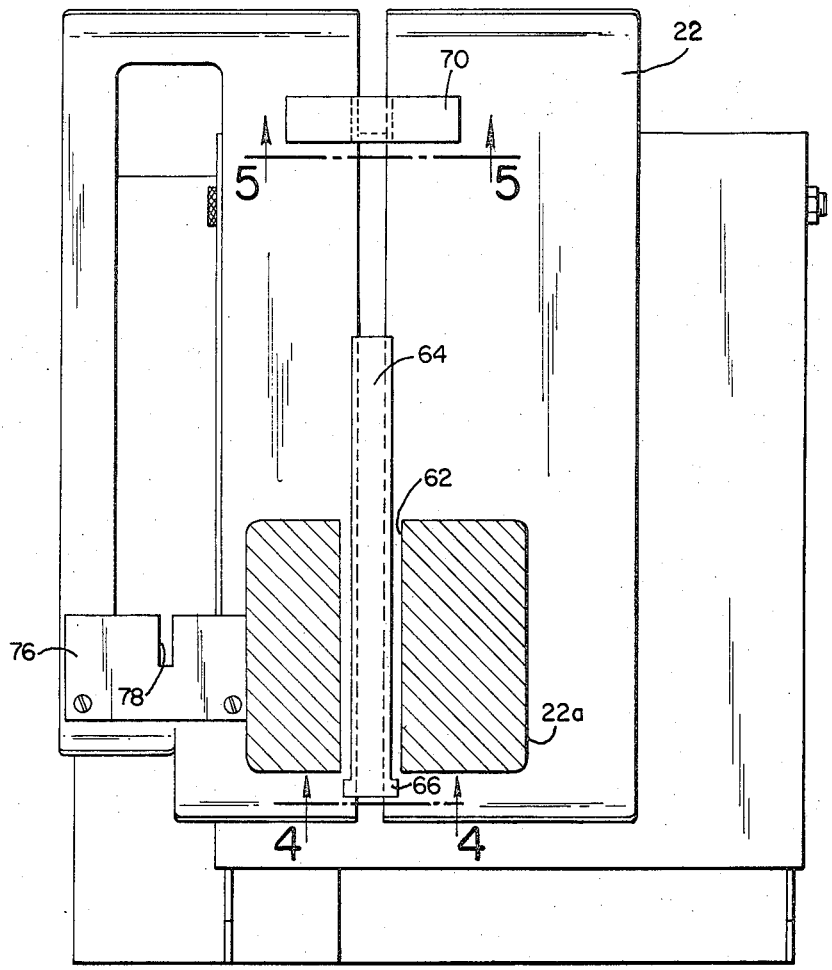
FIG. 3 is a horizontal section taken generally as indicated at 3—3 in FIG. 2.
Figure 4:
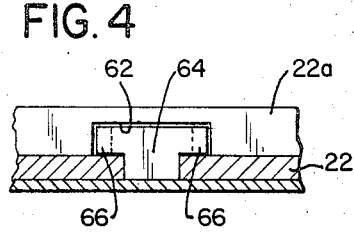
FIG. 4 is an enlarged fragmentary vertical section taken generally as indicated at 4—4 in FIG. 3.
Figure 5:
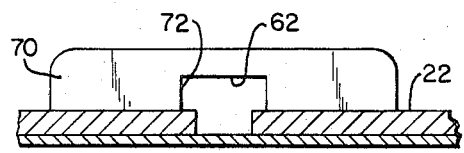
FIG. 5 is an enlarged fragmentary vertical section taken generally as indicated at 5—5 in FIG. 3.

Mounting of the saw 10 and movement of the same relative to the plate 56 is preferably provided for by means of an appropriate guide and guideway arrangement. More particularly, the aforementioned base plate 22 of the saw 10 is provided with a guideway in the form of a T-slot 62 which extends in parallelism with the plane of the saw blade 12. As best illustrated in FIGS. 3, 4 and 5, the T-slot 62 extends through an upper or raised portion 22a of the base plate 22 and receives a stationary guide in the form of a T-slide 64. The T-slide 64 preferably includes a small lateral extension 66 at a forward end portion thereof and the slide is fixedly secured to the plate 56 as by means of suitable bolts at 68, FIG. 2. Thus, the hand saw 10, grasped by an operator at the handle 20, can be conveniently moved toward and away from tubes such as 40, 42, 44 in a sliding motion. On engagement of the saw blade with a tube such as 40, 42, 44, a substantially instantaneous radial cut-off operation occurs on continued forward saw movement and the saw may thereupon be withdrawn to a rearwardly or rest position for a succeeding cut.

In its rearward or rest position, the T-slide extension 66 engages an upwardly curved front edge portion of the base plate 22, best illustrated in FIG. 1 at 68, thus providing a front stop for limiting saw movement. Further, a bridge 70 mounted on the base plate 22 at a rear portion has a T-slot portion 72 adapted to receive the body of the T-slide 64 but having a substantial lesser width than the T-slide extension 66. Thus, a rear stop is provided on engagement of the bridge 70 with the T-slide extension 66 on forward movement of the saw relative to the plate 56.

The substantially vertical front edges 46, 48 of the notches 36, 38 serve a purpose which will now be apparent. As the saw moves forwardly into engagement with a tube section disposed in one of said notches, the said vertical edges cooperate with the plate 56 thereabove to overcome any tendency of the tube to climb upwardly out of its notch. Thus, a steady and secure tube position is maintained for an efficient and rapid cut-off operation.

Optional modifications of the saw may include a chip guide extension 74 best illustrated in FIG. 1 and which projects downwardly substantially into engagement with a chip arresting plate 76. The chip arresting plate 76 is best illustrated in FIG. 3 and it will be observed that a slot 78 therein is only slightly larger than the edge cross section of the saw blade 12. Thus, close confinement of chips is achieved with the plate 76 and the guide extension 74.

As will be apparent from the foregoing, a high degree of ease and convenience is provided in the operation of the saw and attachment of the present invention. A tube section may be deposited within an appropriate notch pair merely by tilting the saw and its mounting plate upwardly and rearwardly by means of the saw handle 20. The saw is then permitted to pivot downwardly and forwardly and to bring a front portion of the mounting plate into engagement with a top portion of the tube whereby automatically to secure the same. A simple forward sliding movement of the saw then effects a rapid and efficient tube cut-off operation.

I claim:

1. The combination comprising a portable power operated rotary hand saw including a frame supporting a rotary saw and a driving motor therefor, and an attachment for adapting the saw to radial cut-off operations on copper tubing and the like, said attachment comprising a tube holding device for selectively receiving tubes over a range of diameters and for supporting the same for a radial cut-off operation, and a saw mounting device operatively associated with said portable saw frame and said tube holding device and supporting the saw with its balde arranged for rotation about an axis parallel to the axis of a tube supported by said tube holding device, said saw mounting device also accommodating saw movement toward and away from a tube held by said tube holding device for effecting said cut-off operation, said tube holding device comprising a pair of spaced parallel and upstanding side walls in subadjacent and supporting relationship with said saw mounting device, each of said walls having an upwardly open notch and said notches being alighed so as to receive and support a tube for a cut-off operation as aforesaid, and said saw mounting device being pivotally supported at a rear end portion on said side walls of said tube holding device, a forward end portion thereof at least partially overlying said side wall notches whereby to retain a tube therein during said cut-off operation, said side wall notches being so dimensioned as to provide for the upward projection of tubes beyond the mouths of the notches, the tube thus being engaged directly by a forward end portion of said saw mounting device and urged downwardly in the notches by the weight of the saw and motor.

2. The combination as set forth in claim 1 wherein said saw mounting device and saw are connected for relative sliding movement of the latter toward and away from a tube as aforesaid.

3. The combination as set forth in claim 2 wherein said saw frame includes a base plate provided with a guideway extending in parallel relationship with the plane of said saw blade, and wherein said saw mounting device includes a guide slidably received in said guideway.

4. The combination as set forth in claim 3 wherein said guideway takes the form of a T-slot, and wherein said guide takes the form of a complementary T-slide.

5. The combination as set forth in claim 4 wherein front and rear stops are provided for limiting said sliding movement of said saw and for retaining said saw in its mounted position on said saw mounting device.

6. The combination as set forth in claim 5 wherein said front stop is provided by a lateral T-slide extension and a cooperating upwardly curved front edge portion of said saw base plate, and wherein said rear stop is provided by said T-slide extension and a cooperating bridge mounted on said saw base plate.

7. The combination as set forth in claim 2 wherein each of said notches has a substantially vertical front edge and an inclined rear edge for accommodation of tubes over a range of diameters.

8. The combination as set forth in claim 2 wherein each of said side walls has a pair of notches one of which is substantially larger than the other, the notches of equal size in said walls being aligned in identical pairs as aforesaid.

* * * * *